United States Patent
Sundholm (12)

(10) Patent No.: US 11,939,174 B2
(45) Date of Patent: Mar. 26, 2024

(54) METHOD FOR CONVEYING MATERIAL IN A PNEUMATIC MATERIAL CONVEYING SYSTEM, AND PNEUMATIC MATERIAL CONVEYING SYSTEM

(71) Applicant: Maricap Oy, Vantaa (FI)

(72) Inventor: Göran Sundholm, Tuusula (FI)

(73) Assignee: Maricap Oy, Vantaa (FI)

( * ) Notice: Subject to any disclaimer, the term of this patent is extended or adjusted under 35 U.S.C. 154(b) by 0 days.

(21) Appl. No.: 17/792,177

(22) PCT Filed: Nov. 16, 2020

(86) PCT No.: PCT/FI2020/050763
§ 371 (c)(1),
(2) Date: Jul. 12, 2022

(87) PCT Pub. No.: WO2021/144497
PCT Pub. Date: Jul. 22, 2021

(65) Prior Publication Data
US 2023/0044045 A1 Feb. 9, 2023

(30) Foreign Application Priority Data
Jan. 14, 2020 (FI) .................................... 20205032

(51) Int. Cl.
*B65F 5/00* (2006.01)
*B65G 53/24* (2006.01)
(Continued)

(52) U.S. Cl.
CPC ............. *B65G 53/24* (2013.01); *B65G 53/52* (2013.01); *B65G 53/60* (2013.01)

(58) Field of Classification Search
None
See application file for complete search history.

(56) References Cited

U.S. PATENT DOCUMENTS 3,771,294 A * 11/1973 Ronning ................ B65G 53/60
55/460
3,989,308 A * 11/1976 Zimmermann ........ B65G 53/24
406/170
(Continued)

FOREIGN PATENT DOCUMENTS

CN 201961839 U 9/2011
CN 102858658 A 1/2013
(Continued)

OTHER PUBLICATIONS

PCT International Search Report for PCT Application No. PCT/FI2020/050763 dated Feb. 10, 2021 (5 pages).
(Continued)

*Primary Examiner* — Joseph A Dillon, Jr.
(74) *Attorney, Agent, or Firm* — Merchant & Gould P.C.

(57) ABSTRACT

A method and system for conveying material in a pneumatic material conveying system includes a material input point, a material conveying pipe connectable with a feed-in container, the system being configured to provide a pressure difference in the material conveying pipe that includes a partial-vacuum generator, and a separator device in which the transported material is separated from the transport air at an outlet end of the material conveying system. The material is conveyed in a first stage from the input point to a conveying pipe, into a container space of an intermediate container arranged between the input point and the separator device by a suction/pressure difference provided by the partial vacuum generator in a first time period, and the material conveyed into the container space of the intermediate container is conveyed by a suction/pressure difference provided by the partial-vacuum generator to the separator device.

38 Claims, 6 Drawing Sheets

(51) Int. Cl.
    *B65G 53/52*     (2006.01)
    *B65G 53/60*     (2006.01)

(56) References Cited

U.S. PATENT DOCUMENTS

| | | | | |
|---|---|---|---|---|
| 5,033,914 | A * | 7/1991 | Wuertele | B65G 53/28 |
| | | | | 222/61 |
| 5,575,596 | A * | 11/1996 | Bauer | B65G 53/24 |
| | | | | 406/173 |
| 6,890,129 | B2 * | 5/2005 | Fabbri | F26B 25/002 |
| | | | | 406/146 |
| 7,228,990 | B2 * | 6/2007 | Schmidt | E04C 5/076 |
| | | | | 406/33 |
| 7,785,044 | B2 * | 8/2010 | Sundholm | F04F 5/52 |
| | | | | 406/48 |
| 8,113,745 | B2 * | 2/2012 | Aoki | B65G 53/525 |
| | | | | 406/197 |
| 8,491,228 | B2 * | 7/2013 | Snowdon | B01J 8/0055 |
| | | | | 406/14 |
| 8,727,671 | B2 * | 5/2014 | Sundholm | B65F 5/005 |
| | | | | 406/198 |
| 9,446,915 | B2 * | 9/2016 | Sundholm | B65F 5/005 |
| 9,937,651 | B2 * | 4/2018 | Zinski | B65G 53/66 |
| 10,227,186 | B2 * | 3/2019 | De Jager | B65G 53/16 |
| 10,414,083 | B2 * | 9/2019 | Zinski | B29C 48/288 |
| 10,689,192 | B2 * | 6/2020 | Sundholm | B65G 53/46 |
| 2011/0226129 | A1 * | 9/2011 | Huziwara | B04C 5/13 |
| | | | | 95/271 |
| 2012/0308314 | A1 | 12/2012 | Sundhold | |
| 2014/0328633 | A1 | 11/2014 | Nierescher et al. | |
| 2015/0375935 | A1 | 12/2015 | Sundholm | |
| 2016/0280473 | A1 * | 9/2016 | Veselov | B65G 53/66 |
| 2018/0282081 | A1 * | 10/2018 | Hong | B65G 53/50 |
| 2019/0255794 | A1 * | 8/2019 | Bishop | B23Q 11/005 |
| 2023/0010206 | A1 * | 1/2023 | Thomas | B65G 53/38 |

FOREIGN PATENT DOCUMENTS

| | | | |
|---|---|---|---|
| CN | 104066660 | A | 9/2014 |
| CN | 104507829 | A | 4/2015 |
| CN | 209796852 | U | 12/2019 |
| CN | 115367341 | A * | 11/2022 |
| GB | 2038750 | A | 7/1980 |
| JP | S59198222 | A | 11/1984 |
| JP | H05162809 | A | 6/1993 |
| JP | 2886777 | B2 | 2/1999 |
| JP | 2004075332 | A | 3/2004 |
| JP | 2019182591 | A | 10/2019 |
| KR | 100757174 | B1 | 9/2007 |
| KR | 20110049611 | A | 5/2011 |
| WO | 2011/008669 | A1 | 1/2011 |
| WO | 2011/098666 | A1 | 8/2011 |
| WO | 2011/098667 | A1 | 8/2011 |
| WO | 2011/110740 | A2 | 9/2011 |
| WO | 2013/079783 | A1 | 6/2013 |
| WO | 2013/079784 | A1 | 6/2013 |
| WO | 2011/098668 | A1 | 8/2018 |

OTHER PUBLICATIONS

PCT Written Opinion for PCT Application No. PCT/FI2020/050763 dated Feb. 10, 2021 (8 pages).

Finnish Search Report for FI Application No. 20205032 dated Jul. 13, 2020 (2 pages).

Chinese Office Action with Search Report dated May 11, 2023 for corresponding Chinese Application No. 202080096859.0 (18 pages including English Translation.

Handbook of Construction Planning of Hydraulic and Hydroelectric Projects, vol. 4, Auxiliary Plants, edited by General Administration of Hydraulic and Hydroelectric Construction of Ministry of Water Resources and Electric Power, pp. 336-337, China Water & Power Press, Aug. 1991.

* cited by examiner

Emptying of input points (60) = Filling of a intermediate container (200)

Emptying of an intermediate container (200) = Filling of a material container (90A)

Filling of an intermediate container (200A)

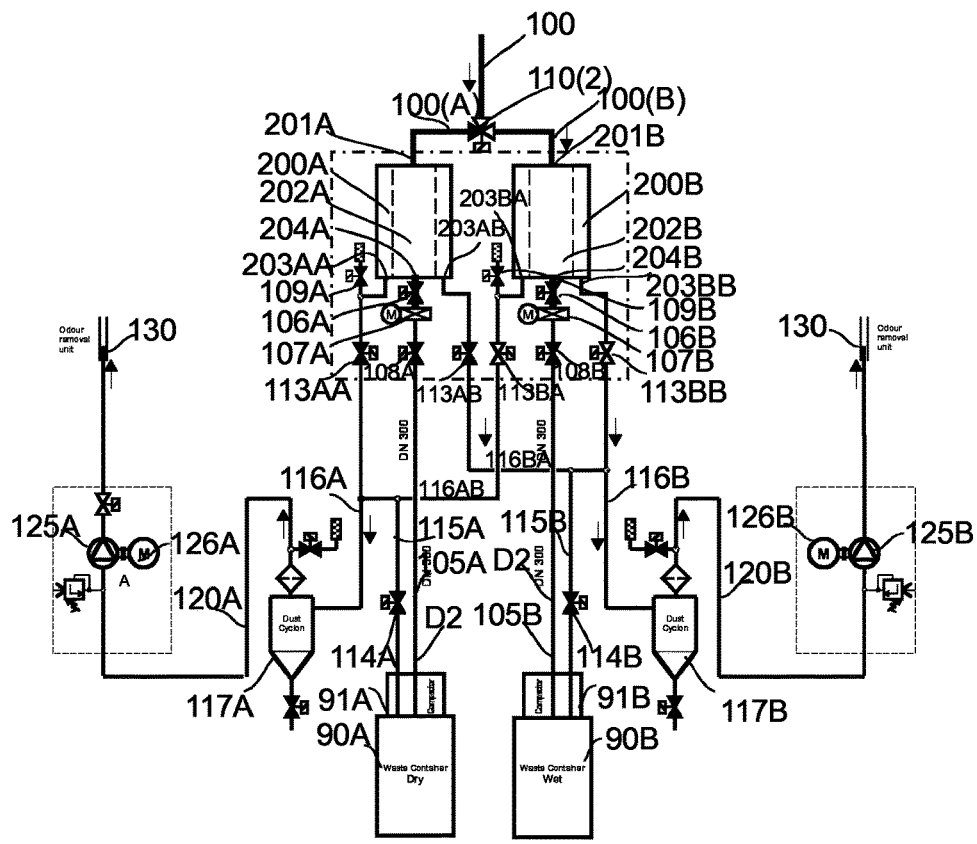
FIG. 4  Filling of an intermediate container (200B)
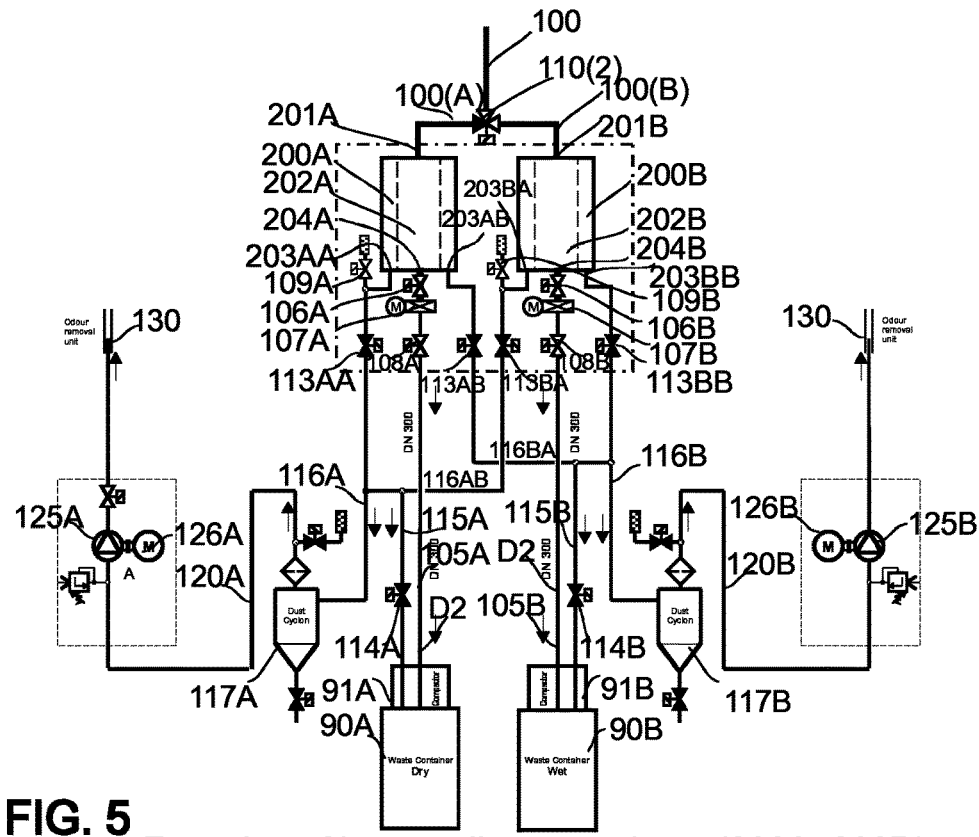
FIG. 5  Emptying of intermediate containers (200A, 200B)

METHOD FOR CONVEYING MATERIAL IN A PNEUMATIC MATERIAL CONVEYING SYSTEM, AND PNEUMATIC MATERIAL CONVEYING SYSTEM

CROSS-REFERENCE TO RELATED APPLICATION(S)

This application is a National Stage Application of PCT/FI2020/050763, filed 16 Nov. 2020, which claims benefit of Serial No. 20205032, filed 14 Jan. 2020 in Finland, and which applications are incorporated herein by reference. To the extent appropriate, a claim of priority is made to each of the above disclosed applications.

BACKGROUND OF THE INVENTION

The invention relates generally to pneumatic material conveying systems, such as to partial-vacuum transport systems, particularly to the collection and conveying of wastes, such as to the conveying of household wastes.

Systems in which wastes are conveyed in a piping by means of suction are known. In them the wastes are conveyed for long distances in a conveying pipe by means of a pressure difference, such as suction and replacement air, in a transport air flow. The apparatuses are used for conveying material, e.g. wastes, in various installations or for conveying waste material or recyclable material in urban areas. It is typical of the apparatuses that a partial-vacuum apparatus is used to provide the pressure difference, in which apparatus a negative pressure is provided in the conveying pipe by means of partial-vacuum generators. Partial-vacuum generators may include for example partial-vacuum pumps, blowers or ejector apparatuses. In the conveying pipe there is typically at least one valve member, by opening and closing of which the replacement air coming to the conveying pipe is regulated. The partial-vacuum conveying systems typically involve e.g. the following problems: the consumption of energy is high, the air flow in the piping is high, noise problems as well as dust and particulate problems in the outlet pipe. In addition, particularly at long distances in which the conveying pipe lengths may be several thousand meters, the pressure loss increases, whereby in order to ensure satisfactory operation of the conveying system, very large pipe diameters and correspondingly efficient partial-vacuum generators, pump devices, such as blowers, are needed. Correspondingly, in the systems at the material outlet end, separate separator devices in which the material is separated from the transport air have been used. Under the separator devices there is typically a material container into which the material separated from the transport air is moved from the separator device. At the outlet end of the system, the space requirement of the separator device and the material container located thereunder is high, particularly in the vertical direction. This leads to very expensive solutions in terms of costs. Due to large pipe sizes, more space is required for installations.

Especially in systems in which the conveying distance is long, intermediate containers have been used. The material is first conveyed in the conveying pipe into the intermediate container and thereafter from the intermediate container along the conveying pipe to the material outlet end, at which the material is separated from the transport air and moved into the material container.

It has been possible to reduce the pipe sizes used by using, in connection with waste input devices or refuse chutes, material shapers, specifically rotary shapers, which shape and pack the material in order for it to fit into a conveying pipe having a smaller diameter than normally. The rotary shapers have been disclosed for example in documents WO 2011/098666, WO 2011/098667, WO2011/098668 and WO 2011/8669. However, at very long waste conveying distances the pressure losses may become high in the conveying pipings.

The object of this invention is to further develop said systems and provide a completely novel solution in connection with material conveying systems, by means of which the problems of the prior solutions can be avoided. Another object of the invention is to provide a solution suitable for partial-vacuum conveying systems, which solution is suitable for systems in which the pipe size of the conveying pipe is large in at least a part of the system.

BRIEF DESCRIPTION OF THE INVENTION

The invention is based on an idea that at least part of a conveying piping before an intermediate container has a first pipe size and between the intermediate container and a material container the conveying pipe has a second pipe size. According to an embodiment of the invention the second pipe size is smaller than the first pipe size. In the method the material is conveyed at a fast pace in a first time period from input points into the intermediate container. In a second stage, which may be considerably longer in duration than the first time period, the material is conveyed from the intermediate container into a separator container at the outlet end of the system.

The method according to the invention is primarily characterized by the features described in the claims.

The embodiments of the method according to the invention are further characterized by the features described in claims 2-14.

The system according to the invention is primarily characterized by the features described in the characterizing part of claim 15.

The embodiments of the system according to the invention are further characterized by the features described in claims 16-25.

The solution according to the invention has many significant advantages. By using the system for conveying the material in two stages, of which in a first stage the input points are emptied and the material thereof is conveyed to a branch conveying pipe, to a material conveying pipe and further from the material conveying pipe into an intermediate container, and in a second stage the material is conveyed from the intermediate container into a collecting container, to a separator device at the outlet end of the system. When in the first stage the waste is conveyed into the intermediate container, the pressure loss may be kept low, as in the same conveying piping or in a section thereof between the intermediate container and the outlet end only transport air is simultaneously conveyed, whereby the pressure loss for the full pipe section is low.

In the system it may be considered a special advantage that the size of the conveying piping may be different before the intermediate container than after the intermediate container. Accordingly, a larger pipe size may be used, if desired, in the material conveying direction before the intermediate container in the material conveying pipe and a smaller pipe size may be used after the intermediate container.

According to one embodiment, by means of the piping provided with a larger pipe size the wastes are conducted from the input points into the intermediate container. The intermediate container may be located in a section between the material input point and the material outlet end. According to one embodiment the intermediate container is arranged in a material collecting station. The collecting station is preferably located in proximity to the outlet end or the outlet end is also located in the collecting station.

When conveying the material, the material belonging to the same material species may be conveyed from the input points into the intermediate container. The intermediate container may accordingly be sized such that in an emptying period, all or a large part of the material belonging to the same material species fits into the intermediate container. It is also possible to divide the material conveying system into suitable parts.

From the intermediate container the material is conveyed in a material conveying pipe having a smaller size into the separator container. The separator container may be provided with a press. The separator container is preferably also a material transport container.

The material may be conveyed at a fast pace from the input points into the intermediate container. Thus, the time for which the input points are out of the material feed use may be minimized. The second stage in which the material is conveyed from the intermediate container into the separator container may be implemented between the emptying periods of the first stage. This stage may be implemented at a slower pace than the input point emptying period, because there is time between the emptying operations.

By means of the solution according to the invention the use of energy may also be optimized, because with a mere large piping the processing of waste, for example from a separate separator device to a transport container at the collecting station takes time, and that slows down the collecting. With direct suction into the intermediate container, in which the time-consuming processing of the material is not needed, this downside can be avoided.

The properties of partial-vacuum generators, such as partial-vacuum pumps, may be efficiently utilized in the solution according to the invention. In the first stage, i.e. collecting the material from the input points into the intermediate container, in the piping having a larger nominal diameter a high pump output is used. When conveying the material from the intermediate container in a pipe having a smaller nominal diameter, only approximately a third of the pump output of the first stage is needed. Thus, as desired, the intermediate container may be emptied and two or three material fractions conveyed at the same time into the separator container at the outlet end with a corresponding pump output that has to be used in the conveying in the first stage from the input points into the intermediate container.

The solution according to the invention makes it possible to have a collecting station which is more compact in volume. The construction size of the collecting station is reduced as compared with solutions in which a large pipe size and separate separator devices and transport containers are used. In the solution according to the invention the size of the piping and the components is much smaller, whereby it may if necessary be formed compact in shape. The invention also makes it possible to have a vertically smaller collecting station than before. The high cyclone-type separator devices are not needed, but direct-vacuum containers which at the same time are transport containers may be used as the separator devices. In the systems according to the prior art in which pipe sizes with a large nominal diameter are used and with the high air flow needed for transport, e.g. 21.000m3/h (which a DN 500 pipe requires), the direct-vacuum containers may not be utilized as separator devices because the separator capacity thereof is limited. In the solution according to the invention, from the intermediate container to the direct-vacuum containers used as the separator devices, a pipe size with a smaller nominal diameter may be used, whereby a considerably lower air flow is needed for transport of the material (e.g. a DN 300 pipe needs only 7.000 m3/h). Thereby, the direct-vacuum containers which also operate as transport containers may be efficiently utilized according to the invention as the separator devices.

In the solution according to the invention, the intermediate container may be used as an addition to the possible other containers of the system, whereby the total capacity of the material conveying system increases.

At longer conveying distances, several intermediate stations arranged successively at a distance from each other and parallel conveying pipes or medium channels therebetween may be used. The conveying piping or the medium channeling are so constructed that the first stage from the input point to a first intermediate container is realizable with one conveying pipe and the following stage from the first intermediate container to a second intermediate container or to the waste station is realizable with two parallel conveying pipes and the following stage from the second intermediate container to the waste station is realizable for example with three conveying pipes. This could be further extended at longer conveying distances. The idea is that when there are long conveying distances, intermediate containers are needed between the input points and the waste container due to the pressure loss. When the distance is long, the pressure loss for one pipe would become too high, whereby two pipes are needed in the second stage and three pipes are needed in the third stage. By using several parallel pipes in the following stages and by providing via them a suction for the intermediate stations, efficient conveying of the material may be achieved in the previous stage. Thus, parallel conveying pipes having a similar internal diameter may preferably be used between the intermediate container and the separator containers arranged for example in the collecting station. According to the invention, a negative pressure is provided via several conveying pipes or medium channels.

By using material shapers in connection with the input point and/or the intermediate container, the pipe diameters may be reduced and at the same time the pressure loss at long conveying distances may be controlled. According to an embodiment of the invention, the diameter of the material conveying pipe may therefore also be reduced at least between the intermediate container and the separator container at the outlet end. By means of the embodiments, considerable savings are achieved, because the conveying piping has a smaller diameter and the conveying air volume needed for conveying the material is smaller.

BRIEF DESCRIPTION OF THE FIGURES

In the following section, the invention will be described in more detail by way of an example, with reference to the accompanying drawing, in which FIG. 4 illustrates part of one system according to another embodiment of the invention as a diagram in a second operating state, FIG. 5 illustrates part of one system according to another embodiment of the invention as a diagram.

DETAILED DESCRIPTION OF THE INVENTION

The features presented in combination with other features in the following paragraphs may also be applied separately, if needed.

Figure 1:
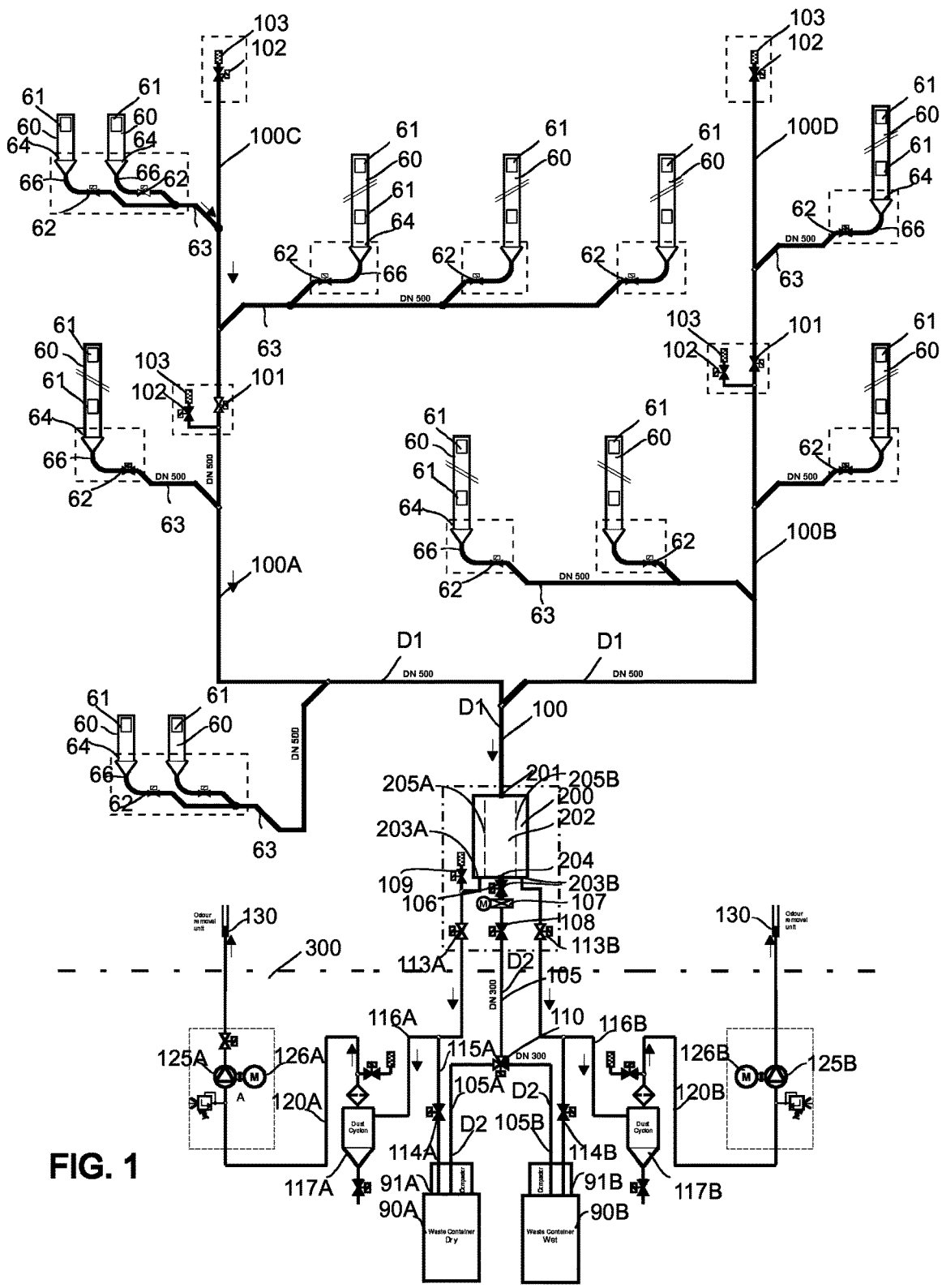
FIG. 1 illustrates one system according to an embodiment of the invention as a diagram in a first operating state.

FIG. 1 illustrates, as a simplified diagram, one pneumatic material conveying system according to an embodiment according to the invention. The embodiment of the pneumatic material conveying system may be, according to the one embodiment, a waste material or recyclable material collecting and conveying system. In the pneumatic material conveying system, the material may be conveyed from an input point 60 in a material conveying pipe 100, 100A, 100B, 100C, 100D by means of a pressure difference in a transport air flow to an outlet end of the material conveying system. At the outlet end the transported material may be separated from the transport air flow in a separator device 90A, 90B. The separator device may be for example a separator container. The pressure difference and transport air flow needed when conveying the material may be provided for example by means of a partial-vacuum generator 125A, 125B, a suction side of which may be connected to act in the material conveying pipe 100. At the same time, replacement air may be conducted to the material conveying pipe.

FIG. 1 illustrates a material conveying pipe 100. Along the material conveying pipe 100, at least one, typically several, branch conveying pipes 63 may be arranged. The material conveying pipe 100 may be divided, for example by means of valve members 101, into several conveying pipe sections 100A, 100B, 100C, 100D. The material conveying pipe 100 may in one embodiment comprise one or more pipe sections to which the branch conveying pipe 63 is connected. According to one embodiment the material conveying pipe 100 may thus be formed of several conveying pipe sections 100A, 100B. The conveying pipe sections 100A, 100B may comprise conveying pipe sections which branch off from the conveying pipe 100. In the embodiment of FIG. 1 the material conveying pipe 100 comprises two branches. A first branch of the material conveying pipe may comprise one or several pipe sections 100A, 100C. A second branch of the material conveying pipe may comprise one or several pipe sections 100B, 100D. In the material conveying pipe or along the branch conveying pipes thereof, material input points 60 may be arranged. The input point 60 may be a feed-in container for the transported material, specifically waste material, or a refuse chute from which the transported material, specifically waste material, such as household waste, is fed to the conveying system. The system may comprise several input points 60 from which the transported material is fed to the conveying piping. At the input point 60 there may be a feed-in container 66 which is connectable to the branch conveying pipe 63. The material may be fed from an input aperture 61 of the input point for being conducted to the material conveying pipe 100. The input aperture 61 of the input point may comprise an openable and closable hatch. Between the feed-in container 66 of the input point and the branch conveying pipe 63 there may be a valve member 62. By opening and closing the valve member 62 the material may be conveyed from the input point to the conveying pipe. The input point 60 may thus be connected to the branch conveying pipe 63, and further to the material conveying pipe 100. To the branch conveying pipe 63, one or more input points 60 may be connected. A conveying pipe section of the material conveying pipe and/or a branch conveying pipe section and/or the input point may be provided with means for allowing and preventing the access of replacement air to the material conveying pipe. According to one embodiment the means for allowing and preventing the access of replacement air may comprise a replacement air connection or an aperture which may be provided with a replacement air valve 102, by means of which the access of replacement air to the conveying pipe may be regulated. In connection with the replacement air convection or the aperture, a silencer 103 and/or a filter device may be arranged.

The replacement air needed when emptying the feed-in container of the input point 60 may be introduced via the input point. According to one embodiment, in connection with the input point there may be a separate replacement air connection 64.

Emptying the input points 60 and/or the feed-in containers 66 thereof may be carried out following an order where the feed-in container of the input point located in the material conveying direction closer to the outlet end or an intermediate container 200 is emptied first, and the feed-in container of the input point located next closest against the material conveying direction is emptied next, and so on, until the desired feed-in containers of the input points have been emptied. The corresponding emptying order is also applied to the feed-in containers of the branch conveying pipe, whereby the feed-in container located in the material conveying direction closer to the main conveying pipe in the branch conveying pipe 63 is emptied first, and the feed-in container located next closest against the material conveying direction is emptied next, and so on, until the desired feed-in containers of the input points have been emptied.

The material fed from the input point 60 to the branch conveying pipe 63 is transported to the material conveying pipe 100, to a pipe section, and therealong towards the outlet end.

Figure 6:
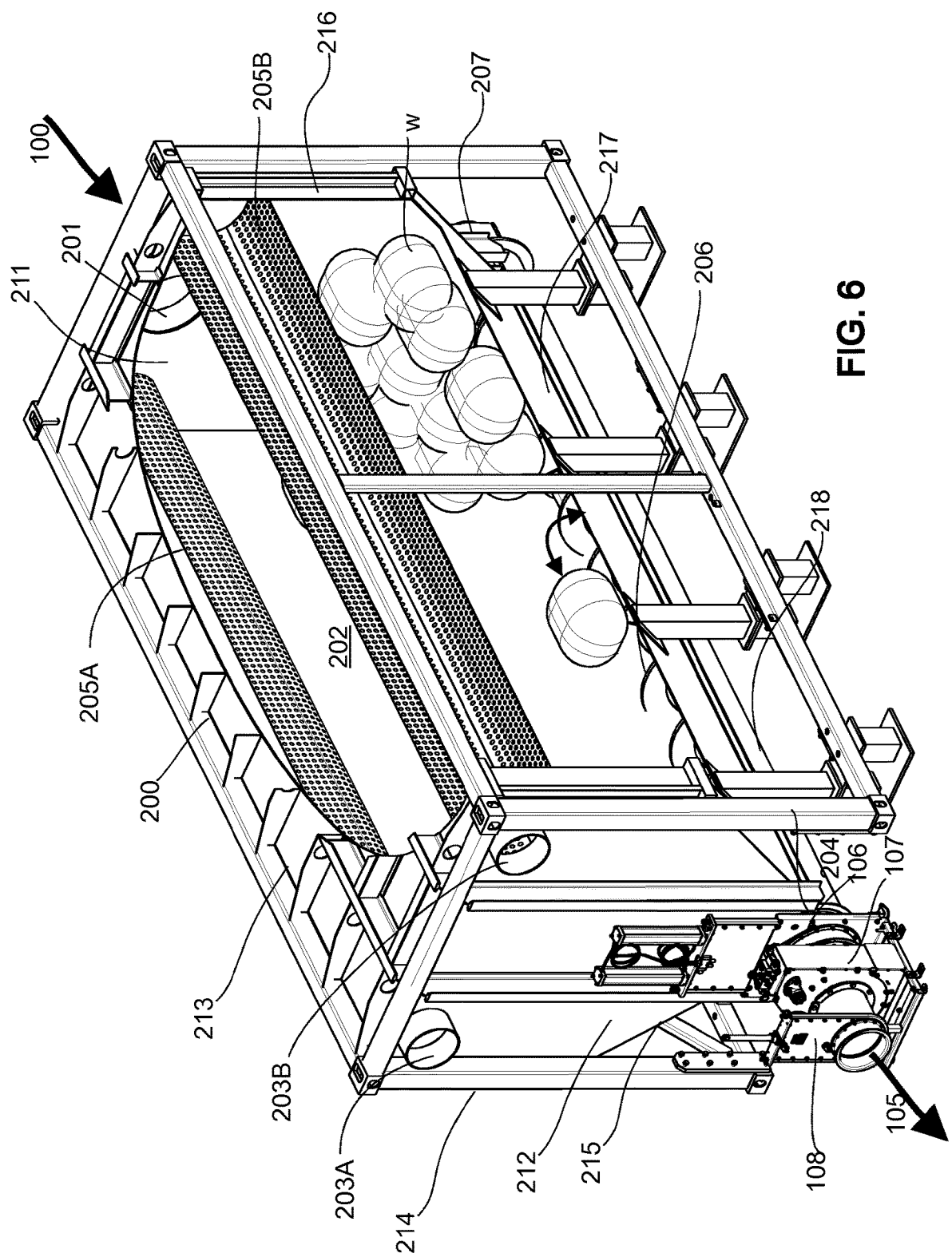
FIG. 6 illustrates an intermediate container according to one embodiment of the invention with part of an upper wall and a side wall of the intermediate container sectioned/removed.

According to one embodiment the material conveying system may comprise an intermediate container 200. From the input points 60, in the material conveying piping, such as in the branch conveying pipe and the material conveying pipe, the material may be conveyed by means of a transport air flow and/or pressure difference provided by the partial-vacuum generator into the intermediate container 200. The intermediate container 200 may be arranged in the material conveying pipe, typically in the conveying pipe between the input point 60 and the outlet end of the material conveying system. The outlet end may typically be located at a material collecting station 300 in which the transported material is separated from the transport air in a separator device, for example a separator container 90A, 90B. The intermediate container 200 may comprise a container space 202 into which the material is conducted by means of the material conveying pipe via an input aperture 201 arranged in a wall of the intermediate container. The conveying pipe 100 may be arranged to the intermediate container from the material inlet side to the input aperture 201 of the intermediate container. The input aperture 201 of the intermediate container 200 may, according to one embodiment, be arranged in a wall 211 of the intermediate container. FIG. 6 illustrates an embodiment of one intermediate container. The intermediate container 200 may comprise a container space 202 into which the material may be fed via the input aperture 201. In the container space 202 of the intermediate container the material may be stored temporarily. In order to empty the intermediate container, the material conducted into the intermediate container may be fed from an output aperture 204 of the intermediate container to a conveying pipe 105, to be conducted further to the separator device 90A, 90B. Between the container space 202 of the intermediate container 200 and the conveying pipe 105, a valve member 106 may be arranged, by opening and closing of which the conveying of material from the feed-in container 202 of the intermediate container 200 via the material output aperture 204 to the conveying pipe 105 and further to the separator device of the waste system may be regulated.

The intermediate container 200 may be provided, in an upper part of the intermediate container 200, with a medium passage 203A, 203B. The medium passage 203A, 203B may be a so-called suction aperture in which the suction side of the partial-vacuum generator 125A, 125B may be connected to act in order to convey the material from the input points 60 or from the feed-in containers 66 via the material conveying pipe 100 into the container space 202 of the intermediate container. The upper part of the container space 202 of the intermediate container 200 may be provided with a separator wall 205A, 205B which comprises apertures through which the transport air flow passes from the container space via the suction apertures 203A or 203B while transported material w (illustrated in FIG. 6) is left in the container space 202. The intermediate container 200 may be provided with a conveyor 206. According to one embodiment the conveyor 206 may be a screw conveyor which is driven by means of an actuator 207. The conveyor 206 may be arranged to convey the material in the intermediate container.

In the embodiment of FIG. 6 the intermediate container 200 comprises an upper wall 213 which may connect end walls 211, 212. The end walls 211, 212 extend down from the upper wall 213 and are spaced from each other. The intermediate container may comprise side walls 214, 216. The side walls may extend down from the upper wall 213. The side walls may be spaced from each other. The side walls may connect the end walls 211, 212. Lower parts 215, 217 of the side walls 214, 216 may extend towards a base part 218 of the container. The lower parts 215, 217 of the opposite side walls may extend towards each other, i.e. obliquely inwards. The container space 202 may thus be formed in its lower part as a downwardly tapering chamber space. The conveyor 206 of the intermediate container 200 may be arranged in the lower part of the container space 202. The conveyor may be arranged in the downwardly tapering section of the container space 202 delimited by the lower parts 215, 217 of the side walls 214, 216. The conveyor 206 may be arranged in the container space 202 to facilitate the conveying of the material w from the container space 202 of the intermediate container towards the material output aperture 204. According to one embodiment, when the conveyor is operated by means of the actuator 207, the material may move in the container space 202 towards the material output aperture 204. According to one embodiment, the conveyor may be operated by means of the actuator 207 also in the reverse direction, whereby the material may move in the material space away from the output aperture 204. The conveyor 206 may be for example a screw conveyor, the thread surfaces of the conveyor screw of which may convey the material when the conveyor screw is rotated by means of the actuator 207. In connection with the intermediate container, according to one embodiment between the feed-in container 202 and the conveying pipe 105, a material shaper 107 may be arranged. By means of the material shaper 107 the material may be packed or otherwise shaped so as to better fit into the material conveying pipe 105 leading out from the intermediate container. According to one embodiment the material shaper may be a so-called rotary shaper, in which the material may be conducted through one or more annular rotatable processing member apertures from a first side to a second side. The processing members of the rotary shaper may pack, i.e. compress in volume, the material so as to fit into a conveying pipe having a smaller nominal size. In the embodiment of FIG. 6 the material may be conducted substantially in a direction different from the vertical direction through the material shaper to the conveying pipe 105. In the embodiment of FIG. 6 the material may be conveyed to the material shaper substantially in a horizontal direction. According to the embodiment of FIG. 6 the intermediate container 200 may be formed in a frame, the support structures of which correspond to the dimensions of a so-called standard transport container. Thus, the intermediate container may be easily transported to the installation site by means of transport equipment designed for transferring standard transport containers. The intermediate container 200 may in one embodiment also be provided without the material shaper.

Figures 7, 7A:
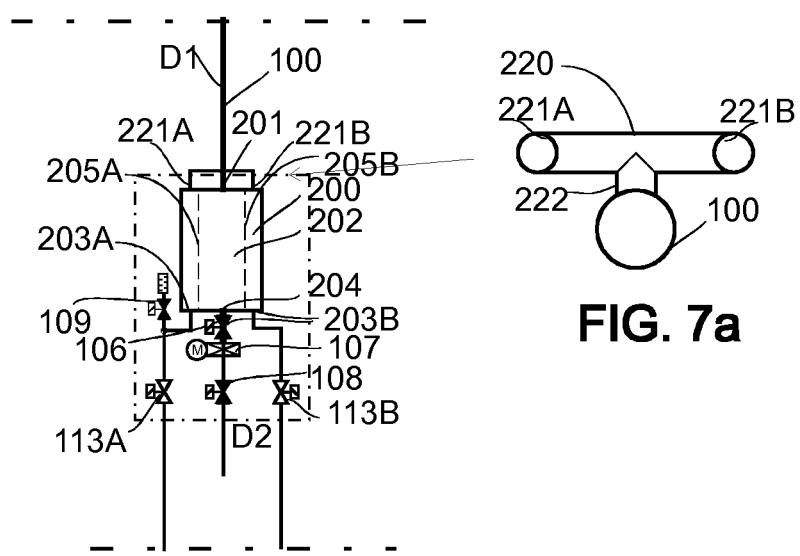
FIG. 7 illustrates part of one system according to an embodiment of the invention in a first operating state.
FIG. 7a illustrates a detail of the part embodied in the embodiment according to FIG. 7.

FIGS. 7 and 7a illustrate, according to one embodiment, a bypass channel arranged in connection with the intermediate container. The bypass channel 220 may be arranged to cause part of the transport air flow to bypass the input aperture 201, 201A, 201B of the intermediate container 200, 200A, 200B. The bypass channel may comprise a channel section by means of which, from the upper part of the intermediate container, at least one additional channel 221A, 221B may be arranged to the conveying pipe 100 in the material conveying direction before the intermediate container. Thereby, part of the transport air flow may bypass the input aperture 201 of the intermediate container. According to one embodiment, the point of connection of the additional channel 221A, 221B to the intermediate container may be located towards the side of the separator wall 205A, 205B facing away from the container space 202 of the intermediate container. The channel section 220 may be joined by means of a connection section 222 to the material conveying pipe 100. The channel section 220 may reduce the turbulence of the air flow possibly taking place in the intermediate container. Part of the suction effect provided by the partial-vacuum generator may be conducted via the suction apertures 203A, 203B of the intermediate container, via the channel space delimited by the side of the separator wall 205A, 205B facing away from the container space 202 of the intermediate container and the upper wall 213 and the side wall 214 or 216 to the additional channel 221A, 221B and to the conveying pipe 100. Thus, the entire transport air flow need not pass into the intermediate container from the input aperture 201. This may reduce the turbulence in the container space of the intermediate container.

At least part of the conveying piping before the intermediate container 200 may have a first pipe size D1, and between the intermediate container 200 and the material separator container 90A, 90B the conveying pipe may have a second pipe size D2. According to an embodiment of the invention the second pipe size D2 may be smaller than the first pipe size D1.

According to another embodiment the intermediate container 200 may also be different. The intermediate container 200 may be formed in its structure as a simple container which may be formed in its dimensions, for example in its nominal diameter, as a larger pipe section than the conveying pipe.

The material collecting station 300 may also be the material outlet end. The collecting station may be, as in FIG. 1, equipped with means for providing a pressure difference and/or transport air flow in the conveying piping. The means for providing the pressure difference and/or transport air flow may comprise partial-vacuum generators 125A, 125B and actuators 126A, 126B thereof. In addition, means for conducting replacement air are needed, which may be located in different parts of the system, for example in connection with the input points and/or the conveying piping. The suction side of each partial-vacuum generator 125A, 125B may be connectable by means of a medium connection, for example channels 120A, 120B, 116A, 116B, directly via the intermediate container 202 and/or via channel 115A, 115B and one or more separator devices 90A, 90B at the outlet end of the material conveying system at the collecting station to the conveying piping 105A, 105; 105B, 105, and further to the intermediate container, and further to the conveying pipe 100.

FIG. 1 illustrates as a simplified diagram an operating state in which the feed-in container 66 of the input point 61 may be emptied by way of the conveying piping into the intermediate container 200. The diagram illustrates how one input point is emptied. The small arrows indicate the transport air flow (and conveying of the material into the intermediate container).

In the operating state, several partial-vacuum generators of the embodiment may be utilized for providing the transport air flow. The suction side of the partial-vacuum generator 125A, 125B may be connected to act along a medium passage 120A, 117A, 116A; 120B, 117B, 116B in the suction aperture 203A, 203B arranged in the upper part of the intermediate container 200. In the embodiment, the output of one or more partial-vacuum generators may be utilized. A valve 113A, 113B of the medium passage 116A, 116B may be open, whereby the suction effect of the partial-vacuum generator is able to act via the suction aperture 203A, 20B of the intermediate container in the container space 202 of the intermediate container and further via the input aperture 201 arranged in the upper part of the intermediate container in the material conveying pipe 100 and further in the material conveying pipe section 100A, 100C thereof. If the material conveying pipe 100 comprises a zone valve 101 or zone valves by means of which the material conveying pipe may be divided into material conveying pipe sections 100A, 100B, 100C, 100D, as in FIG. 1, between the intermediate container 200 and the feed-in container 66 of the input point 61, also the zone valve 101 may be arranged in the open position. From the input point 61 the material may move to the branch conveying pipe 63. From the branch conveying pipe the material may move further to the material conveying pipe section 100C and conveying pipe section 100A. From the conveying pipe section 100A the material (and the transport air flow) may move into the container space 202 of the intermediate container 200. The material w (FIG. 6) is left in the container space 202 of the intermediate container. The transport air flow may pass through the apertures of the separator wall 205A, 205B and further via the suction aperture 203A, 203B out of the intermediate container. The transport air flow may pass further along the medium channels 116A, 116B and via the medium channel 120A, 120B and the particle filter 117A, 117B possibly arranged therein to the partial-vacuum generator 125A, 125B, via the suction side to the blowing side and further to an exhaust pipe 130.

In the embodiment of FIG. 1, at the collecting station 300 which may be for example a waste container there may be several, for example two, separator devices 90A, 90B. The separator devices may be one at a time connectable to the material conveying pipe 105 coming from the output aperture 204 of the intermediate container. The input aperture of each separator device 90A, 90B may be connected into medium communication with the material conveying pipe 105 coming from the intermediate container 200. The material conveying pipe 105 may be provided with one or more valve members 110. From the valve member 110, a conveying pipe section 105A or 105B may lead to the corresponding separator device 90A, 90B. By adjusting the position of the valve members 110, an access may be opened from the conveying pipe 105 to the separator device 90A, 90B. The upper part of each separator device 90A, 90B may be provided with a medium channel 115A, 115B. The medium channel 115A, 115B may be provided with a valve member 114A, 114B for opening and closing a connection to the suction side of the partial-vacuum generator 125A, 125B. When the connection of the medium channel 116A, 116B from the partial-vacuum generators to the suction apertures 203A, 203B in the upper part of the intermediate container may be closed, for example by means of the valves 113A, 113B, the suction of the partial-vacuum generator may be connected to act via the separator device 90A, 90B in the material conveying pipe 105 which leads to the output aperture 204 of the intermediate container. In the embodiment of FIG. 1 the medium channel 115A, 115B may be arranged to connect to the medium channel 116A, 116B and further via the particle filter 117A, 117B to the medium channel 120A, 120B and to the suction side of the partial-vacuum generator.

The medium passage 115A, 115B is connectable by means of the valve member 114A, 114B further to the next medium passage 116A, 16B which leads to the particle separator 117A, 117B. From the upper part of the particle separator 117A, 117B, the medium passage 120A, 120B leads further to the suction side of the partial-vacuum generator 125A, 125B. The blowing side of the partial-vacuum generator is provided with a passage which leads to the exhaust air duct 130.

By means of the valve member 114A, 114B, the suction/negative pressure provided by the partial-vacuum generator 125A, 125B may be connected with the desired separator device 90A, 90B. The suction/negative-pressure effect may further be connected with the conveying pipe section 105 by opening a connection by means of the valve 110 from the selected separator device 90A, 90B, from the conveying pipe section 105A, 105B.

According to the invention, one or more input points 60 connected to the branch conveying pipes 63 of the conveying pipe section 100A, 100B, 100C, 100D located before the intermediate container in the material conveying direction may be emptied first. For this purpose, the suction side of the partial-vacuum generators is connected via the suction apertures 203A, 203B of the intermediate container 200 and the input aperture of the intermediate container further up to each given conveying pipe section 100A . . . 100D.

The negative pressure provided by the partial-vacuum generator, acting in the suction side of the pump device in FIG. 1, causes the waste material to move by the effect of the pressure difference from the feed-in container 66 to the branch conveying pipe when the valve 62 is open, and further via the corresponding conveying pipe section 100A, 100B, 100C, 100D to the container space of the intermediate container 200 in which the transported material is separated from the transport air and is left in the container space 202.

In the situation of FIG. 1 the feed-in containers of the input points 60 are emptied via the branch conveying pipe to the main conveying pipe and further into the intermediate container 201 of the intermediate container, until the desired input points have been emptied. This emptying stage is typically arranged so as to last for as short amount of time as possible, so that the input points would be for as short amount of time as possible out of the state in which the material may be fed via them.

One embodiment of the method is characterized in that material W is conveyed from the input points 60 into the intermediate container 200 in one or more first time periods t1.

According to one embodiment the material is conveyed from the intermediate container 200 to the material outlet end, such as into the separator container 90A, 90B, in at least one second time period t2.

According to one embodiment the second time period t2 in which the material is conveyed from the intermediate container to the outlet end, such as into the separator container, may be scheduled for a time period between two and/or more first time periods t1.

According to one embodiment the second time period t2 has a longer duration than one or more first time periods t1.

According to one embodiment, at the outlet end there is a material separator container, whereby the container comprises means for separating the material from the transport air. The separator container may also be a transport container.

The number of the branch conveying pipes 63 depends on the size of the system. There may thus be considerably more or less of the branch conveying pipes 63 than what is illustrated in FIG. 1. The number of the input points 60 may vary according to the need of the site.

Figure 2:
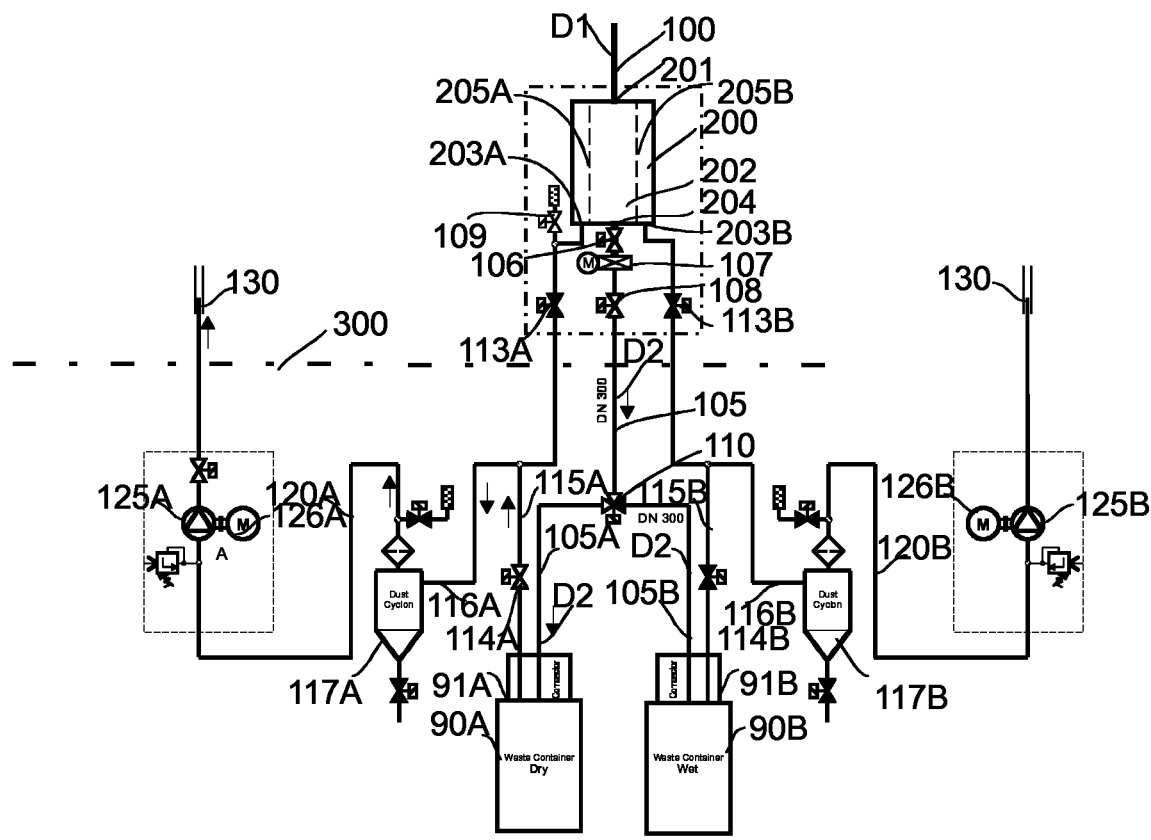
FIG. 2 illustrates part of one system according to an embodiment of the invention as a diagram in a second operating state.

FIG. 2 illustrates a second operating state in which the container space 202 of the intermediate container 200 is emptied and the container space of the separator container 90A is filled up. The material may accordingly be conveyed from the container space 202 of the intermediate container along the material conveying pipe 105 into at least one separator container 90A, 90B. The material may be processed by means of a material shaper 107 by packing so as to fit into the material conveying pipe 105. A nominal dimension D2 of the material conveying pipe 105 forming the material passage in the material conveying direction may be smaller than a nominal dimension D1 of the material conveying pipes 100, 100A, 100B, 100C, 100D used before the intermediate container 200.

Via the material conveying pipe, a connection is opened between the intermediate container and the separator container. Between the output aperture 204 of the intermediate container and the separator container 90A, 90B there may be at least one valve 106, 108, whereby a connection from the intermediate container to the separator container may be provided by opening the valve 106, 108. The suction of the partial-vacuum generator 125A is connected to act via the medium channel 115A in the separator container 90A and further via the material conveying pipe section 105A in the material conveying pipe 105. From the separator container, the suction further acts in the material conveying pipe section 105. The suction and on the other hand the replacement air which may be conducted via a replacement air connection into the intermediate container provide the pressure difference needed when conveying the material. The replacement air may be conducted by opening, for example by means of a valve member 109, the access of the replacement air into the intermediate container. Thereby the material moves from the container space of the intermediate container 200 to the conveying pipe 105. The conveying of the material from the container space may be enhanced by using the conveyor 206 which is illustrated in FIG. 6.

The passage of the conveyed material may be controlled by changing the position of a valve 110 to the material conveying pipe section 115A, 115B leading to one of the separator containers 90A, 90B. The material may be directed to the desired separator container 90A, 90B, for example according to the material type. The material type may be for example a waste type, such as mixed waste, recyclable waste, paper, glass, metal, etc. When the container space of the separator container fills up, the separator container 90A may be changed for another, empty, separator container. Depending on the application, the material may be directed to move from the intermediate container into another separator container 90B. This may be accomplished by switching the passage from the intermediate container 200 by means of the valve 110 to a material conveying pipe section 105B to which the other separator container 90B is connected.

In FIG. 2 the material may be directed by means of the valve 110 to pass from the material conveying pipe 105 via the pipe section 105A into the container space of the separator container 90A. In connection with the separator container 90A, a material press 91A may be used for packing, i.e. compacting the material into the container space of the separator container. In FIG. 2 the arrows indicate how the material moves with the transport air from the intermediate container into the separator container. The material is separated from the transport air flow in the separator container. From the separator container onwards in the transport air flowing direction the arrows mainly indicate the passage of the transport air flow in medium channels 115A, 116A, 120A and in the exhaust pipe 130. In the transport air flow there may be, even after the separator container, some degree of material particles which may be separated from the transport air flow in the particle separator 117A and in a possible filter.

Figure 3:
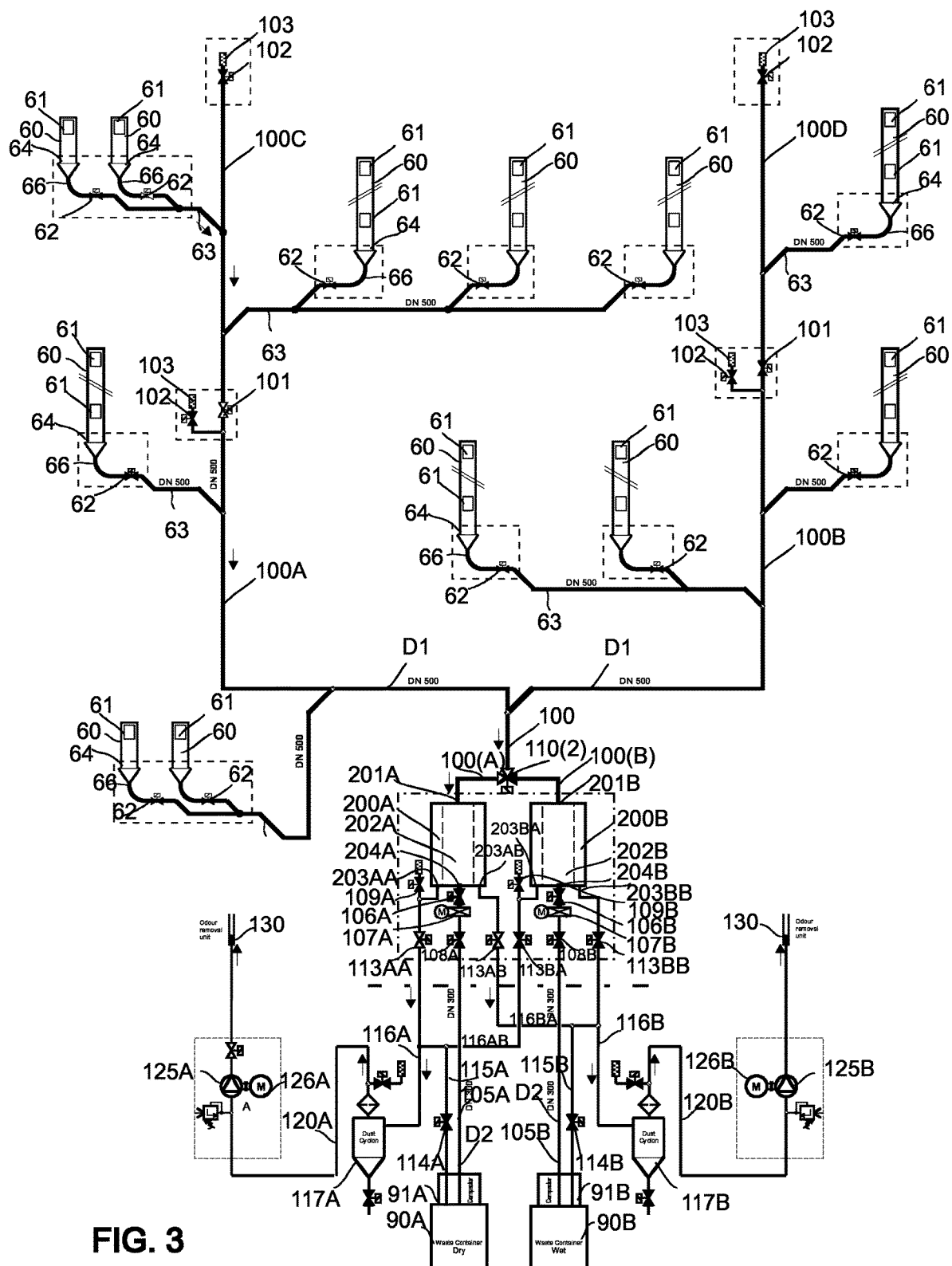
FIG. 3 illustrates one system according to another embodiment of the invention as a diagram in a first operating state.

FIG. 3 illustrates an alternative in which the conveying piping 100 may be provided with several intermediate containers. In the example of the figure, two intermediate containers 200A, 200B are provided. The reference numbering of the components of the intermediate containers primarily corresponds to the numbering of FIG. 1, but a letter indicating the intermediate containers has been added after the reference numbers, A (for the components of the intermediate container 200A) or B (for the components of the intermediate container 200B). The material conveying piping before the intermediate container is provided with a valve member 110(2). The conveyed material may be directed from the material conveying pipe 100 to move into one or more intermediate containers. The material may be directed to move for example into the intermediate container 200A or 200B. In the figure the valve 110(2) is disposed in a position in which the material may be conveyed into a container space 202A of a first intermediate container 200A. The conveyed material may be directed into the desired intermediate container for example according to the conveyed material type. Also the container capacity of the system may be increased by using several intermediate containers which may be filled up and emptied in a desired manner. In FIG. 3, after the container spaces 202A, 202B of the intermediate containers 200A, 200B, the material passages, in the material conveying direction, may be provided with material shapers 107A, 107B. By means of the material shapers 107A, 107B the material may be shaped into a more packed form. By means of the material shapers 107A, 107B the material may be shaped so as to fit into the material conveying pipes 105A, 105B. The nominal dimensions D2 of the material conveying pipes 105A, 105B forming the material passage in the material conveying direction may be smaller than the nominal the dimensions D1 of the material conveying pipes 100, 100A, 100B, 100C, 100D used before the intermediate containers 200A, 200B.

The embodiment of FIG. 3 comprises means for connecting the suction side of each partial-vacuum generator to connect to the first suction aperture of the intermediate container and/or to the suction aperture of the second intermediate container. According to one embodiment a suction side of a first partial-vacuum generator 125A may be connected with the connection means to act in a first suction aperture 203AA of the first intermediate container and in a first suction aperture 203BA of the second intermediate container. A suction side of a second partial-vacuum generator 125B may be connected with the connection means to act in a second suction aperture 203AB of the first intermediate container and in a second suction aperture 203BB of the second intermediate container. The means for connecting the suction side of the first partial-vacuum generator to the first intermediate container may comprise a medium passage 120A, 116A. The medium passage may be provided with at least one valve member 113AA. By means of the valve member 113AA, the given passage from the suction side to the first suction aperture 203AA of the intermediate container may be opened and closed. The means for connecting the suction side 125A of the first partial-vacuum generator to the second intermediate container 200B may comprise a medium passage 120A, 116A 116B. The medium passage 120A, 116A 116B may be provided with at least one valve member 113BA. By means of the valve member, the given passage from the suction side to the suction aperture 203BA of the second intermediate container may be opened and closed.

The means for connecting the suction side of the second partial-vacuum generator to the second intermediate container 200B may comprise a medium passage 120B, 116B. The medium passage 120B, 116B may be provided with at least one valve member 113BB. By means of the valve member 113BB, the given passage from the suction side to the suction aperture 203BB of the second intermediate container may be opened and closed. The means for connecting the suction side of the second partial-vacuum generator 125B to the first intermediate container 200A may comprise a medium passage 120B, 116B, 116BA. The medium passage 120B, 116B, 116BA may be provided with at least one valve member 113AB. By means of the valve member 113AB, the given passage from the suction side to the suction aperture 203AB of the first intermediate container may be opened and closed.

According to one embodiment, one or more input points 60 connected to branch conveying pipes 63 of a conveying pipe section 100A, 100B, 100C, 100D located before the first intermediate container 200A in the material conveying direction may be emptied first. For this purpose, the suction side of the partial-vacuum generators 125A, 125B may be connected to act via the suction apertures 203AA, 203AB of at least one first intermediate container 200A and the input aperture 201A of the intermediate container further up to each given conveying pipe section 100A . . . 100D. Accordingly, a connection from the material conveying pipe section 100 to the first intermediate container may be provided by means of the valve 110(2). The suction side of the first partial-vacuum generator 125A may be connected to act in the suction aperture 203AA of the first intermediate container 200A by opening a passage therefor. This may be done for example by opening the valve 113AA. Correspondingly, the suction side of the second partial-vacuum generator 125B may be connected to act in at least one suction aperture of the first intermediate container 200A. According to one embodiment (for example in the case of FIG. 3) this may be achieved by connecting the suction side of the second partial-vacuum generator 125B to act in the second suction aperture 203B of the first intermediate container 200A. This may be done for example by opening the valve 113AB of the medium channel. According to one embodiment, for example in the embodiment of FIG. 3, the suction sides of several partial-vacuum generators 125A, 125B may be connected to act in the input point 61 emptying stage (and in the intermediate container filling stage) via the first intermediate container 200A in the conveying pipe 100. Thus, efficient conveying of the material into the intermediate container in the first material conveying pipe which has the first nominal dimension D1 may be efficiently achieved.

When the first intermediate container 200A fills up, or if for another reason the second intermediate container 200B is to be filled with the material from the input points 61, the suction sides of several partial-vacuum generators 125A, 125B may be connected to act via at least one of the suction apertures 203BA, 203BB of the second intermediate container 200B in the intermediate container and further in a conveying pipe section 100(B), 100, 100A, 100B, 100C, 100D. One operating state of this embodiment is illustrated in FIG. 4. Accordingly, the conveying pipe section 100 may be connected into medium communication with the container space of the second intermediate container 200B by means of the valve 110(2). Then the suction side of the first partial-vacuum generator 125A may be connected to act in the suction aperture 203BA of the second intermediate container 200B by opening a passage therefor. This may be done for example by opening the valve 113BA. Correspondingly, the suction side of the second partial-vacuum generator may be connected to act in at least one suction aperture of the second intermediate container 200B. According to one embodiment, for example in the case of FIG. 4, this may be achieved by connecting the suction side of the second partial-vacuum generator 125B to act in the second suction aperture 203BB of the second intermediate container 200B by opening a passage thereto. This may be achieved by opening the valve 113BB of the medium channel. In the embodiment of FIG. 4 the suction sides of several partial-vacuum generators 125A, 125B are connected to act in the input point 61 emptying stage (and in the intermediate container filling stage) via the second intermediate container 200B in the conveying pipe 100.

The negative pressure provided by the partial-vacuum generators, acting in the suction side of the pump device in FIG. 1, causes the material to move by the effect of the pressure difference from the input container 66 to the branch conveying pipe when the valve 62 is open, and further via the corresponding conveying pipe section 100A, 100B, 100C, 100D, 100(B) into the container space 202B of the intermediate container 200B in which the transported material is separated from the transport air and is left in the container space 202B.

In the situation of FIGS. 1, 3 and 4 the feed-in containers of the input points 60 are emptied via the branch conveying pipe to the main conveying pipe and further into the intermediate containers 200, 200A, 200B, until the desired input points have been emptied. This emptying stage is typically arranged so as to last for as short amount of time as possible, so that the input points would be for as short amount of time as possible out of the state in which the material may be fed via them.

FIG. 5 illustrates yet another embodiment of the system of the invention, in which there are several, for example two intermediate containers 200A, 200B. From each intermediate container 200A, 200B there is a conveying pipe section 105A, 105B leading to the collecting station, to the container 300. From the first intermediate container 200A there is a first conveying pipe section 105A, which is according to FIG. 5 connectable to at least one of separator containers 90A, 90B. From the second intermediate container 200B there is a conveying pipe section 105B, which is connectable to at least one of separator containers 90A, 90B. In the embodiment of FIG. 5, from the first intermediate container 200A the first conveying pipe section 105A leads to the first separator device 90A. From the second intermediate container 200B the second conveying pipe section 105B leads to the second separator device 90B. This makes it possible that the first intermediate container 200A may be emptied along the first conveying pipe section 105A to the first separator device, preferably into the separator container 90A, and the second intermediate container 200B may be emptied along the second conveying pipe section 105B to the second separator device, preferably into the separator container 90B.

The material may thus be conveyed from a container space 202A of the first intermediate container along the material conveying pipe 105A into the first separator container 90A. The material may be processed by means of a material shaper 107A by packing so as to fit into the conveying pipe 105A having a smaller nominal dimension D2. The conveying pipe 100, 100A, 100B, 100C, 100D used in conveying the material before the intermediate container 200A is larger in its nominal dimensions D1 than the nominal dimension D2 of the conveying pipe 105A located after the intermediate container 200A in the material conveying direction.

In the material conveying pipe between an output aperture 204A of the first intermediate container 200A and the separator container 90A there may be at least one valve 106A, 108A, whereby a connection from the intermediate container to the separator container 90A is provided by opening the valve 106A, 108A. The suction of the first partial-vacuum generator 125A is connected to act via the medium channel 115A in the first separator container 90A and further in the material conveying pipe section 105A, whereby the material moves from the container space of the first intermediate container 200A to the conveying pipe 105A. From the separator container the suction acts further in the material conveying pipe section 105A. The suction and on the other hand the replacement air which may be conducted via the replacement air connection by opening, for example by means of a valve member 109A, the access of the replacement air into the intermediate container, provide a pressure difference, whereby the material moves from the container space of the first intermediate container 200B to the conveying pipe 105B. The conveying of the material from the container space may be enhanced by using the conveyor 206 which is illustrated in FIG. 6.

The material may thus be conveyed from a container space 202B of the second intermediate container along the material conveying pipe 105B into the second separator container 90B. The material may be processed by means of a material shaper 107B by packing so as to fit into the conveying pipe 105B having a smaller nominal dimension D2. The conveying pipe 100, 100A, 100B, 100C, 100D used in conveying the material before the intermediate container 200B is larger in its nominal dimensions D1 than the nominal dimension D2 of the conveying pipe 105B located after the intermediate container 200B in the material conveying direction.

In the material conveying pipe between an output aperture 204B of the second intermediate container 200B and the separator container 90B there may be at least one valve 106B, 108B. A connection from the intermediate container to the separator container 90B may be provided by opening the valve 106B, 108B. The connection from the intermediate container to the separator container 90B may be closed by closing the valve 106B, 108B. The suction of the second partial-vacuum generator 125B may be connected to act via the medium channel 115B in the second separator container 90B. From the separator container the suction acts further in the material conveying pipe section 105B. The suction and on the other hand the replacement air which may be conducted via the replacement air connection by opening, for example by means of a valve member 109B, the access of the replacement air into the intermediate container, provide a pressure difference, whereby the material moves from the container space of the second intermediate container 200B to the conveying pipe 105B. The conveying of the material from the container space may be enhanced by using the conveyor 206 which is illustrated in FIG. 6.

According to one embodiment, the material may be simultaneously conveyed from the first intermediate container 200A into the first separator container 90A by means of the transport air flow provided by the first partial-vacuum generator and from the second intermediate container 200B into the second separator container 90B by means of the transport air flow provided by the second partial-vacuum generator. According to one embodiment the nominal dimensions D2 of the conveying pipes used in the second stage of the embodiment are smaller than the nominal dimensions D1 of the conveying pipes used in the conveying in the first stage. The nominal dimension may mean according to one embodiment for example a nominal diameter or a mean diameter.

The conveying piping sections 100 may in one embodiment be provided with a replacement air connection which is equipped with valve members 102. The valve member 102 is open for example when material is to be conveyed in the conveying piping and the valves 62 of the input points 60.

In the description, two partial-vacuum generators 125A, 125B have been used above in the example. There may also be more of the partial-vacuum generators and they may typically be used by connecting them into groups, for example into two groups.

By means of the partial-vacuum generators, the negative pressure, pressure difference and/or transport air flow needed for transport of the material is provided in the conveying piping and/or in a part thereof. There may also be more of the partial-vacuum generators or less than described according to the embodiment of the system.

By using material shapers 17 in the intermediate containers 200 a rather small pipe diameter of the conveying piping is achieved as compared to the usual between the intermediate container and the collecting station, for example a nominal pipe diameter of the order of approximately 200-300 mm.

By means of the embodiments, considerable savings are achieved, because the conveying piping is smaller in its diameter and the conveying air volume needed for conveying the material is smaller.

The invention thus relates to a method for conveying material in a pneumatic material conveying system, such as a waste conveying system, which material conveying system comprises at least one material, specifically waste material, input point 60, a material conveying pipe 100 which is connectable into medium communication with a feed-in container of the input point 60, means for providing a pressure difference and/or transport air flow in the material conveying pipe at least for the time of transport of the material, which means for providing the pressure difference and/or transport air flow comprise at least one partial-vacuum generator 125A, 125B, and which material conveying system further comprises at least one separator device 90A, 90B, in which the transported material is separated from the transport air at an outlet end of the material conveying system. In the method, the material is conveyed in a first stage from the input point 60 to the material conveying pipe 100, 100A, 100B, 100C, 100D, 100E, into at least one container space 202, 202A, 202B of an intermediate container 200, 200A, 220B arranged between the input point 60 and the separator device 90A, 90B by means of suction/pressure difference and/or transport air flow provided by the at least one partial-vacuum generator 125A, 125B in a first time period t1, and that in a second stage of the method the material conveyed in the previous stage into the at least one container space 202, 202A, 202B of the intermediate container 200, 200A, 200B is conveyed by means of suction/pressure difference and/or transport air flow provided by the at least one partial-vacuum generator 125A, 125B to the separator device 90A, 90B in a second time period t2.

According to one embodiment, in the method the material is conveyed in the first stage in the material conveying pipe 100, 100A, 100B, 100C, 100D selectively into at least one of at least two intermediate containers 200A, 200B, into a container space 202A, 202B.

According to one embodiment, in the method the material is conveyed in the second stage from the container space 202, 202A, 202B of the intermediate container 200, 200A, 200B in a material conveying pipe 105, 105A, 105B selectively to at least one of at least two separator devices 90A, 90B.

According to one embodiment, in the first stage of the method the material is conveyed in a conveying pipe section 100, 100A, 100B, 100C, 100D, 63 which is located in the material conveying direction between the input point 60 and the intermediate container 200, 200A, 200B, and the conveying pipe section of which has a first nominal diameter D1.

According to one embodiment, from the intermediate container 200, 200A, 200B the material is conveyed in the conveying pipe section 105, 105A, 105B to the separator device 90A, 90B, the conveying pipe section of which has a second nominal diameter D2.

According to one embodiment the first nominal diameter D1 of the conveying pipe section 100, 100A, 100B, 100C, 100D, 63 located in the material conveying direction before the intermediate container is larger than the second nominal diameter D2 of the conveying pipe section between the intermediate container and the separator device.

According to one embodiment, the ratio of the second nominal diameter D2 of the conveying pipe section between the intermediate container 200, 200A, 200B and the separator device 90A, 90B in the material conveying direction to the first nominal diameter D1 of the conveying pipe section located before the intermediate container 200, 200A, 200B, i.e. D2/D1 is ½-¾, preferably ⅗.

According to one embodiment the first stage lasts for the first time period t1 and the second stage lasts for the second time period t2, whereby the duration of the first time period t1 of the first stage is shorter than the duration of the second time period t2 of the second stage.

According to one embodiment the second stage in which the material is conveyed from the intermediate container 200, 200A, 200B into the separator container 90A, 90B is implemented in a time period between two first stages in which the material is conveyed from the feed-in containers of the input points into the intermediate container 200, 200A, 200B.

According to one embodiment, in the second stage the material is conveyed from several intermediate containers 200A, 200B at the same time into several separator containers 90A, 90B.

According to one embodiment the material conducted from the container space 202, 202A, 202B of the intermediate container to the conveying piping 105, 105A, 105B is processed by means of a shaping device 107, such as a rotary shaper.

According to one embodiment in the method, in the first stage, a suction side of the partial-vacuum generator 125A, 125B is connected to act in the intermediate container 200, 200A, 200B, for example in an upper part thereof.

According to one embodiment in the method, in the first stage, the suction sides of several partial-vacuum generators 125A, 125B are connected to act in the intermediate container 200, 200A, 200B and further in the material conveying pipe section 100, 100A, 100B, 100C, 100D between the input point and the intermediate container.

According to one embodiment, in the second stage of the method the suction side of the partial-vacuum generator is connected to act via the container space of the separator container 90A, 90B and the material conveying pipe section 105, 105A, 105B in an output aperture 204, 204A, 204B of the intermediate container 200, 200A, 200B.

According to one embodiment, in the second stage replacement air is conducted into the intermediate container by means of replacement air regulating means 109, 109A, 109B.

According to one embodiment, in the first stage, part of the replacement air flow is arranged to bypass an input aperture 201, 201A, 201B of the intermediate container 200, 200A, 200B.

According to one embodiment, in the method the material is fed from the material input points 60 which are waste input points, such as waste bins or refuse chutes.

The invention also relates to a pneumatic material conveying system, such as a waste conveying system, which material conveying system comprises at least one material, specifically waste material, input point 60, a material conveying pipe 100 which is connectable into medium communication with a feed-in container of the input point 60, means for providing a pressure difference and/or transport air flow in the material conveying pipe at least for the time of transport of the material, which means for providing the pressure difference and/or transport air flow comprise at least one partial-vacuum generator 125A, 125B, and which material conveying system further comprises at least one separator device 90A, 90B, in which the transported material is separated from the transport air at an outlet end of the material conveying system. In the system the conveying pipe is provided with at least one intermediate container 200, 200A, 200B in which there is at least one container space 202, 202A, 202B, which is connectable to the conveying pipe between the input point 60 and the separator device 90A, 90B, and that in the system the material is arranged to be conveyed in a first stage from the input point 60 along a conveying piping, a conveying pipe section of which has a first nominal diameter D1, into the intermediate container 200, 200A, 200B, into the container space 202, 202A, 202B thereof, by means of suction/pressure difference and/or transport air flow provided in the conveying pipe by the at least one partial-vacuum generator 125A,125B, and that in the system the material conveyed into the intermediate container 200, 200A, 200B is arranged to be conveyed in a second stage by means of suction/pressure difference and/or transport air flow provided by the at least one partial-vacuum generator 125A, 125B from the intermediate container 200, 200A, 200B to the separator device 90A, 90B in a conveying pipe section 105, 105A, 105B which has a second nominal diameter D2, and that the first nominal diameter D1 is larger than the second nominal diameter D2.

According to one embodiment, the ratio of the second nominal diameter D2 of the conveying pipe section between the intermediate container 200, 200A, 200B and the separator device 90A, 90B in the material conveying direction to the first nominal diameter D1 of the conveying pipe section located before the intermediate container 200, 200A, 200B, i.e. D2/D1 is ⅓-¾, preferably ⅗.

According to one embodiment the material conveying pipe is provided with at least two intermediate containers 200A, 200B, into the container space 202A, 202B of which the transported material is arranged to be conveyed selectively.

According to one embodiment the separator device 90A, 90B arranged at the outlet end is a material transport container, preferably a so-called direct-vacuum container.

According to one embodiment the intermediate container 200, 200A, 200B comprises a container space 202, 202A, 202B which is provided with a conveyor 206, such as a screw conveyor.

According to one embodiment the system comprises a shaping device 107, such as a rotary shaper, for processing the material conducted from the intermediate container 200, 200A, 200B to the conveying pipe 105, 105A, 105B.

According to one embodiment the upper part of the intermediate container is provided with at least one separator wall 205A, 205B, through which the transport air is able to pass.

According to one embodiment, in the system from each intermediate container 200, 200A, 200B the material is arranged to be conveyed along a respective conveying pipe section 105, 105A, 105B to the separator device 90A, 90B.

According to one embodiment the intermediate container 200, 200A, 200B comprises a replacement air channel which is provided with a regulating means, for example a valve member 109, 109A, 109B.

According to one embodiment, in connection with the intermediate container a bypass channel 220 is arranged for causing part of the transport air flow to bypass an input aperture 201, 201A, 201B of the intermediate container 200, 200A, 200B.

According to one embodiment the material input points (60) are waste input points, such as waste bins or refuse chutes.

An outlet valve of the input point is opened and closed such that material portions of a suitable size move from the input point to the conveying pipe. The material is fed from the input point, such as a waste bin or a refuse chute, after the filling up of which the outlet valve is opened either automatically or manually.

It is obvious to a person skilled in the art that the invention is not limited to the above-described embodiments, but it may be modified within the scope of the accompanying claims. The features possibly presented in combination with other features in the description may also be applied separately, if needed.

The invention claimed is:

1. A method for conveying material in a pneumatic material conveying system that comprises at least one material input point, a material conveying pipe connectable into medium communication with a feed-in container of the input point, at least one partial-vacuum generator configured to provide at least one of a pressure difference and transport air flow in the material conveying pipe at least for the time of transport of the material, the material conveying system further comprising at least one separator device, wherein the transported material is separated from the transport air at an outlet end of the material conveying system, the method comprising:
conveying, the material in a first stage from the input point to a conveying pipe into at least one container space of an intermediate container arranged between the input point and the separator device via at least one of a suction/pressure difference and a transport air flow provided by the at least one partial-vacuum generator in a first time period, and
conveying, in a second stage, the material via at least one of suction/pressure difference and transport air flow provided by the at least one partial-vacuum generator to the separator device in a second time period,
wherein in the first stage, the material is conveyed in a conveying pipe section located in the material conveying direction between the input point and the intermediate container, the conveying pipe section having a first nominal diameter,
wherein from the intermediate container, the material is conveyed in a second conveying pipe section to the separator device, the second conveying pipe section having a second nominal diameter, and
wherein the first nominal diameter of the conveying pipe section is larger than the second nominal diameter of the second conveying pipe section between the intermediate container and the separator device.

2. The method according to claim 1, wherein the material is conveyed in the first stage in a material conveying pipe selectively into at least one of at least two intermediate containers, into a container space.

3. The method according to claim 1 wherein the material is conveyed in the second stage from the container space of the intermediate container in the material conveying pipe selectively to at least one of at least two separator devices.

4. The method according to claim 1, wherein a ratio D2/D1 of the nominal diameter of the second conveying pipe section between the intermediate container and the separator device in the material conveying direction to the nominal diameter of the conveying pipe section located before the intermediate container is in a range of 0.5 to 0.75.

5. The method according to claim 1, wherein the first stage lasts for the first time period and the second stage lasts for the second time period, whereby the duration of the first time period of the first stage is shorter than the duration of the second time period of the second stage.

6. The method according to claim 1, wherein the second stage in which the material is conveyed from the intermediate container into the separator container is implemented in a time period between two first stages in which the material is conveyed from the feed-in containers of the input points into the intermediate container.

7. The method according to claim 1, wherein in the second stage the material is conveyed from several intermediate containers at the same time into several separator containers.

8. The method according to claim 1, wherein the material conducted from the container space of the intermediate container to the conveying piping is processed by means of a shaping device.

9. The method according to claim 1, wherein in the method, in the first stage, a suction side of the partial-vacuum generator is connected to act in the intermediate container.

10. The method according to claim 1, wherein in the method, in the first stage, the suction sides of several partial-vacuum generators are connected to act in the intermediate container, and further in the material conveying pipe section between the input point and the intermediate container.

11. The method according to claim 1, wherein in the second stage of the method, the suction side of the partial-vacuum generator is connected to act via the container space of the separator container and the material conveying pipe section in an output aperture of the intermediate container.

12. The method according to claim 1, wherein in the second stage, replacement air is conducted into the intermediate container via replacement air regulating means.

13. The method according to claim 1, wherein in the first stage, part of the transport air flow is arranged to bypass an input aperture of the intermediate container.

14. The method according to claim 1, wherein the material is fed from the material input points which are waste input points.

15. A pneumatic material conveying system, comprises at least one material input point, a material conveying pipe connectable into medium communication with a feed-in container of the input point, at least one partial-vacuum generator configured to provide at least one of a pressure difference and transport air flow in the material conveying pipe at least for the time of transport of the material, the material conveying system comprising:
at least one separator device, in which the transported material is separated from the transport air at an outlet end of the material conveying system, the conveying pipe comprising at least one intermediate container, in which there is at least one container space, connectable to the conveying pipe between the input point and the separator device, and
a waste conveying system,
wherein the material is arranged to be conveyed in a first stage from the input point along the conveying piping, a conveying pipe section of which having a first nominal diameter, into the intermediate container, into the container space thereof, via at least one of suction/pressure difference and transport air flow provided in the conveying pipe by the at least one partial-vacuum generator,
wherein the material conveyed into the intermediate container is arranged to be conveyed in a second stage via at least one of suction/pressure difference and transport air flow provided by the at least one partial-vacuum generator from the intermediate container to the separator device in a second conveying pipe section, which has a second nominal diameter, and
wherein the first nominal diameter is larger than the second nominal diameter.

16. The system according to claim 15, wherein a ratio D2/D1 of the second nominal diameter of the second conveying pipe section between the intermediate container and the separator device in the material conveying direction to the first nominal diameter of the conveying pipe section located before the intermediate container is in a range of 1/3-3/4.

17. The system according to claim 15, wherein the material conveying pipe comprises at least two intermediate containers, into a container space of which the transported material is arranged to be conveyed selectively.

18. The system according to claim 15, wherein the separator device arranged at the outlet end is a material transport container.

19. The system according to claim 15, wherein the intermediate container comprises a container space which comprises a conveyor.

20. The system according to claim 15, wherein the system comprises a shaping device configured to process the material conducted from the intermediate container to the conveying pipe.

21. The system according to claim 15, wherein the upper part of the intermediate container comprises at least one separator wall through which the transport air is able to pass.

22. The system according to claim 15, wherein from each intermediate container, the material is configured to be conveyed along the respective conveying pipe section to the separator device.

23. The system according to claim 15, wherein the intermediate container comprises a replacement air channel which comprises a regulating means.

24. The system according to claim 15, wherein the intermediate container comprises a bypass channel configured to cause part of the transport air flow to bypass an input aperture of the intermediate container.

25. The system according to claim 15, wherein the material input points are waste input points.

26. The method of claim 1, wherein the pneumatic material conveying system comprises as a waste conveying system.

27. The method of claim 1, wherein the at least one material comprises waste material.

28. The method of claim 4, wherein the ratio D1/D1 is equal to 0.6.

29. The method of claim 8, wherein the shaping device comprises a rotary shaper.

30. The method of claim 9, wherein the suction side of the partial-vacuum generator is connected to act in an upper part of the intermediate container.

31. The method of claim 14, wherein the waste input points comprise one of waste bins and refuse chutes.

32. The system of claim 15, wherein the at least one material comprises waste material.

33. The system of claim 16, wherein the ratio is equal to 3/5.

34. The system of claim 18, wherein the separator device comprises a direct-vacuum container.

35. The system of claim 19, wherein the intermediate container comprises a screw conveyor.

36. The system of claim 20, wherein the shaping device comprises a rotary shaper.

37. The system of claim 23, wherein the replacement air channel comprises a valve member.

38. The system of claim 25, wherein the waste input points comprise one of waste bins and refuse chutes.

* * * * *